May 15, 1973    F. L. STOLLER    3,733,226
LAMINATE STRUCTURE SUITABLE FOR CARPET USE AND METHOD OF MAKING
Filed Dec. 22, 1970
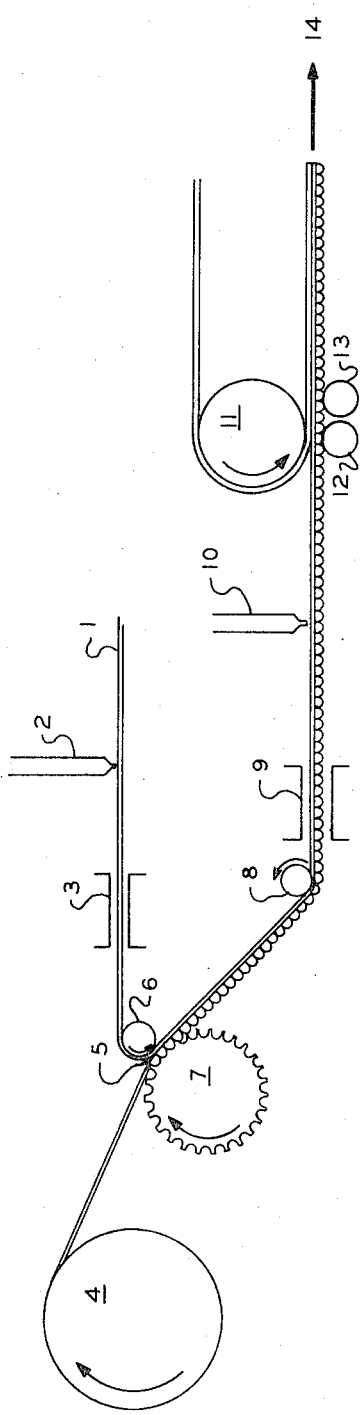
INVENTOR.
F. L. STOLLER
BY
ATTORNEYS

United States Patent Office 3,733,226
Patented May 15, 1973

3,733,226
LAMINATE STRUCTURE SUITABLE FOR CARPET USE AND METHOD OF MAKING
Frederick L. Stoller, Greenville, S.C., assignor to Phillips Petroleum Company
Filed Dec. 22, 1970, Ser. No. 100,702
Int. Cl. B32b 5/00; D04h 11/00
U.S. Cl. 156—72                              3 Claims

ABSTRACT OF THE DISCLOSURE

A laminate structure, as in a carpet, in one form comprises a non-woven heat sealable fabric, heat sealed on one side, laminated with an adhesive to a facing layer of heat sealable fibers, applied as by an embossing roll which can be heated. The non-woven fabric can be a needle-punched assemblage of a scrim and fibers and the assemblage heat sealed on that side of the scrim from which the needles have emerged thus to lock the fibers into the scrim when heat sealing to provide a fibrous, non-heat sealed pad side of the assemblage. The adhesive can be a thermally responsive, i.e., a thermoplastic or thermosetting, film, powder or melt. The adhesive in tacky, fiber receiving condition, as after being passed through a heating zone, is passed together with a face yarn web through an embossing zone, the embossing member of which can be heated. In a modification a further backing can be applied to the non-heat sealed pad side. When the non-woven fabric can be readily heat sealed it can be passed directly together with the face yarn to a heated embossing roll or press and the two heat sealed there together without use of adhesive. Likewise, the second backing can be so applied.

---

This invention relates to a laminate suitable for use as a carpet or like material. It also relates to a method of making a laminate suitable for use as a carpet or like material. Further, the invention relates to the production of a carpet-like material essentially from plastic-like or plastic fibers.

In one of its concepts, the invention provides a laminate structure composed of a facing yarn and a heat sealable non-woven fabric, heat sealed at least on one surface thereof, the facing yarn being fixed to said surface. In another of its concepts, the invention provides a structure wherein the facing yarn is fixed to the heat sealed surface employing for this purpose a layer of suitable adhesive, for example, a readily fusible powder film or a melt. In a further concept, the invention provides a structure as described in which there is fixed to the non-heat sealed surface of said structure a layer of non-woven fabric which has been sealed only on one surface, the last heat sealed surface mentioned being in juxtaposition with the non-heat sealed surface of said structure. In a further concept still, the invention provides a composite structure, as last described, wherein the juxtapositioning is effected wth use of a suitable adhesive material or binder.

In still another concept, the invention provides a non-woven polypropylene fabric heat sealed on one of its surfaces having affixed thereto, as by an embossing press or roll, a web or mat of fibers, which can be carded or combed, in a preferred form the fibers being fixed with a suitable adhesive material, for example, polyvinyl chloride. In still another concept of the invention, it provides a material or structure as herein described, suitable for carpet use and the like, in which various polyolefins from which fibers can be produced are used as starting materials for the production of the non-woven fabric and/or for the production of the face yarn. In a further concept still, the invention provides such structures or laminates as herein described made from at least one or more of the following materials which can be made into or are known to be made into a fibrous non-woven backing or face yarn: polyamides, polyesters, reconstituted cellulose, etc. In a more specific concept of the invention, it provides that the structure will be made in using a single supply of raw material, for example, a polypropylene fiber, a polypropylene film, a polypropylene staple, and a binder which can also be polypropylene.

There are known methods and apparatus for producing non-woven pile carpeting. It is known to apply thermoresponsive adhesive to a suitable flexible material, woven or non-woven, for example, burlap or paper, and to fix to the adhesive a material such as a sheet of felt or slivers or of pile yarns as of wool.

The production of a pliable carpet-like material or composite having nevertheless some rigidity and dimensional stability is desirable.

It has now occurred to me that a non-woven fabric made of a heat sealable material can be heat sealed to yield the physical properties here discussed and then combined with a facing yarn or tufting to produce quite inexpensively a carpet-like material of improved properties.

Thus, it has occurred to me that heat sealing, say, at least one surface of such a fabric, and applying to the heat sealed surface a facing material, I can produce a structure which will be soft to, say, walk upon, yet pliable but possessed of a desired rigidity and dimensional stability without necessarily using burlap or other backing material, the heat sealed portion of the fabric supplying in the laminate the desired characteristics here discussed.

Still further, it has occurred to me that facing yarn can be of a heat sealable material and can be heat sealed to the non-woven fabric on a heat sealed surface thereof as by passing it through an embossing zone or between embossing rollers with or without adhesive.

It is an object of this invention to provide a laminate or carpet-like structure. It is a further object of this invention to provide a carpet-like structure made essentially from a plastic or plastic-type material. It is a further object of this invention to produce a carpet-like structure possessing some rigidity but which is pliable and which is possessed of a high degree of dimensional stability. Still further, it is an object of this invention to produce quite inexpensively a carpet-like structure or laminate employing only non-woven fabrics and/or non-woven facing yarns wherewith to produce simulated tufting. A further object still is to produce a laminate material suitable or cushioning as in carpeting, packing, or other surface or object protection.

Other aspects, concepts, objects, and several advantages of the invention are apparent from a study of this disclosure, the drawings, and the appended claims.

The invention is best discussed in the light of the several views of the drawing which make more clear the structure of several embodiments of the invention.

Referring to the drawings, in FIG. 1 there is shown an embodiment of an arrangement, according to the invention, with which a carpet or laminate also according to the invention can be assembled. In FIG. 2 is shown in cross section an assemblage of a carpeting according to the invention. In FIG. 3 is shown a cross section of a modified form of carpeting or laminate.

Referring now to FIG. 1, a primary backing 1 is conveyed, by means not shown for simplicity's sake, and passed under an adhesive or binder supply for coating therewith. The thus coated backing is passed through a heating zone 3 in which the binder material, if it is heat activated, is heated to activate the same. The backing which is now in condition to receive the face yarn is brought together with a face yarn material web supplied by card 4 and passed together therewith to the nip 5 of roller and embossing roll 7. Upon passing roller 8, in this embodiment, the primary backing is heated on its remaining side by being passed through heating zone 9 in which it is heated preliminary to receiving a coating of binder or adhesive material at 10. If desired, the adhesive or binder can be applied before the backing passes through heating zone 9 when one is employed. For example, if a latex is used as adhesive, it can be of such character that little or no heat will be needed. Secondary backing material is rolled at 11 onto the thus prepared remaining side of the primary backing. If desired, rollers 12 and 13 can be used to more firmly press the secondary backing onto the passing assemblage. The product is collected at 14.

Referring now to FIG. 2, 20 is a facing which has been emboss-rolled onto a primary backing at 21 with aid of an adhesive at 22. 21 consists of integral portions a and b. The portion a is the heat sealed surface of the backing 21 while b is the non-heat sealed fibrous portion of the non-woven fibrous mass. The scrim, when present, is not visible apart from the considerably larger mass of fibers which have been needle-punched into it. Also, the heat sealing operation has fused together the non-woven fibrous material and a portion of the fibers which were needle-punched through a scrim material now encompassed within the heat-fused layer.

In FIG. 3 in which portions or elements, which are identical to those of FIG. 2, are identically numbered, 23 is a suitable binding for adhesive material, 24 is a heat sealed surface of a non-woven fibrous mass, and 25 is the non-heat sealed portion of said mass.

While the primary backing, as has just been described to be heat sealed on only one side, can be treated prior to application of the binder to heat or otherwise seal or modify the non-heat sealed side, this is now not preferred because the non-heat sealed fibers, together with the binder or adhesive, provide a better bonding for any later addition to said non-heat sealed side of surface.

The blades or other shapes of the embossing roll can be heated so that the attachment of the face yarn fibers to the non-heat sealed or otherwise treated adhesive-bearing side of the primary backing can be effected not only with pressure but also with at least a portion of the total heat applied to the primary backing up to and at the point at which embossing takes place.

The primary backing now preferred is a heat-sealed-on-one-side-only assemblage of a layer of non-woven polyolefin, more preferably polypropylene, fibers which have been needle-punched into a support which can be spun polyester warp yarn, or a non-woven material such as a fibrillatable, oriented sheet or film of polypropylene having a thickness of the order of from about 1 to about 5 mils. Although this assemblage can be heat sealed on both sides, as noted, preferably only the fiber side is heat sealed to leave an unconsolidated soft or fibrous side.

In one embodiment the face yarn is applied to the heat sealed side of the primary backing. In another embodiment the face yarn can be applied to the non-heat sealed side of the primary backing; also in a still further embodiment face or similar yarn can be applied to both sides of the backing. The embossing roll can be provided with various sized appendages, blades, teeth, needles, rods, etc., and one or more of these can extend further into the face yarn than does another or do others.

The heat sealing, for example, as practiced on one side of a primary backing, will be usually effected to provide some stiffness and will be ordinarily sufficient to produce a layer of about 0.5 to about 2.5-3 millimeters thick. A now preferred thickness when polypropylene is used is of the order of about 1.5 millimeters. This provides a stiffness or stiff layer to which the remainder of the non-woven fibers are attached. The remainder of the backing will be about 2 to about 5 millimeters thick. Of course, depending upon the ultimate nature and use of the laminate whether for carpet or for other purposes, the thicknesses recited may be widely different. In any event, the heat sealed depth is adjusted to give a desired degree of stiffness not only to the unused primary backing but also to the final article or carpet, etc. This heat sealed depth is adjustable to give the desired dimensional stability to the final article or carpet, etc.

When appropriate, as where a thicker assemblage or laminate is desired to be made, stiffness and thickness can be obtained increasingly by adding a layer of a support material, for example, jute which may be impregnated with a heat sensitive adhesive, to the heat sealed surface prior to embossing the face yarn thereonto. In such event, the jute or other material can be heat sealed as by the embossing roll which is heated for the purpose.

Preferably the fibers are combed to be substantially parallel to each other, and the roll will be bladed or serrated, the blades can be heated and each blade will bear onto the fibers at spaced points therealong to impart ridge-like formations at an angle to the direction of the fibers and each ridge will lie from an adjacent ridge approximately the distance between the blades. Heat sealed retention together of the fibers and of these onto the support layer will be at spaced distances and of thicknesses approximating the distance between the blades and their thicknesses. Thusly, an undulated nap, heat sealed through the support, when it is present, is obtained. The jute is heat sealed to the heat sealed side of the primary backing and the non-heat sealed side of the body can be used as a carpet pad integral with the laminated materials. When the support is not present, the face yarn is heat sealed and embossed directly to the heat sealed side or surface of the primary backing.

It will be noted that the structures described are heat sealed at each interface and therefore that a unitary assemblage is provided. This heat sealing exists, even when an adhesive such as polyvinyl chloride is used. The structure possesses a degree of rigidity, yet is pliable as described. This is due to the concept that the non-woven fibers are sealed on at least one side, also as described.

Thus, the heat sealing of the primary backing, according to the invention, and using it to prepare the laminate, provides for the entire assemblage a dimensional stability which is highly desirable and which non-woven materials ordinarily do not possess.

As noted, the fibrous side of the primary backing can be used directly to provide a pad. However, also as noted, a further secondary backing can be applied to the non-heat sealed surface or side of the primary backing. When this is done, the non-heat sealed side can be first heat sealed at least on portions thereof or at least portions thereof can be sealed as a secondary backing is applied thereto.

The secondary backing which can be applied can be the same as or similar to the face yarn and can be similarly applied to produce a two-faced structure which can be used as a semi-permanent partitioning means, as a room divider or separator or other elements. The stiffness of the assemblage will be adjusted as herein described by the degree of the heat sealing applied to the various sides and materials used and by the interposition of materials such as the jute, for example.

Or, the secondary backing can be a pad-type material which is applied by heat sealing, adhesive binder, or both to the non-heat sealed side of the initial assemblage, as described. When the non-heat sealed side is coated with adhesive, the adhesive can be powdered, molten, or it can be a film which can be melted to cause instantaneous sealing or binding of the secondary backing to the initial assemblage. When powdered or molten, the adhesive can be made to penetrate into the interstices of the non-heat sealed fibers.

Heat soaking ovens can be used to set the adhesive into the fibers which are webbed to make a strong bond and to reinforce the layer of fibers.

In any event, and now preferred, the secondary backing can be non-woven fabric heat sealed to the remaining side of the original assemblage and said side can be heat sealed at the time of adding a secondary backing or priorly. The secondary backing is now preferably not sealed on its outer side which can serve as a pad or resilient, skid-free surface.

The non-woven material now preferred is made of a polyolefin, e.g., polypropylene. Such a material is made ordinarily by punching a tow or web of fibers of any desired lengths into a scrim which can be cotton, a plastic, cheesecloth, paper, jute, or other material such as film. When the film is used only the film side of the punched fabric will be sealed. When the scrim is a polyolefin the needle-punched heat sealed fabric will be all polyolefin.

When a binder or adhesive is used to apply the face yarn it will be preferably an extruded polymer, e.g., polypropylene, polyethylene, polyvinyl acetate or polyvinyl chloride, although it can be some other material which can have lower melting or fusion temperature than the primary backing.

Usually when the primary backing is prepared, especially when it is of a polyolefinic fibrous origin, the sealing with heat is restricted to not entirely permeate the fabric thus prepared. A surface heating is effected which normally will seal to produce a sealed layer of the order of about 0.001 inch. Except for special applications, as in the manufacture of tile-like shapes, the fabric after sealing with heat, even if sealed on both sides, will remain soft and/or pliable and not be a rigid slab. Even as a tile-like shape, the heat sealing now preferred will leave the final product to an extent pliable.

The non-woven fibrous materials used to prepare the fabric of which the primary backing is made include the polyolefin and other materials which can be made in one manner or another to provide fibrous materials or fibers which can be needle-punched into a scrim as herein described and as known in the art. Of the polyolefins, polypropylene is preferred, as has been noted. Polyamides, polyesters, polyvinyl chloride, etc. are also useful. Examples of the non-polyolefinic materials are nylon (a polyamide), rayon, cellulose acetate, polyacrylates, polyvinylacetate.

When a material such as polyvinyl chloride is included in the backing, it will serve as adhesive at a low temperature relative to polypropylene, for example, and the separate adhesive can be omitted.

The facing yarns or materials include carded staple polyolefin, preferably polypropylene, polyamides, polyesters, reconstituted cellulose, etc. Irregularly arranged staple can be used when a pattern embossing roll is used which will tie down each of the individual fibers to a very large extent. Preferably carded staple is used for a gear-like roller. More preferably, all materials will be from a single source so that a single supply of raw material can be used, e.g., polypropylene fiber, film, staple, and binder, which can be made from a single production machine setup.

Preferably when the secondary backing is of the same material as the primary backing, the two heat sealed film sides can be attached to each other by a suitable binder material.

The facing yarn is preferably completely sealed or adhered to the backing. By "completely sealed" is meant that virtually each fiber is sealed immediately or directly to the backing.

When a random pad of fibers is used the pressing or embossing roll, or other element used to apply the face yarn, will be preferably of random pattern to insure that the filaments or fibers are each of them pressed against another or directly to the backing if it is fused or melted to receive the fiber or to the adhesive when an adhesive or binder is used. Some fusion of the portions of the face yarn, for example, portions falling under the blades of an embossing roll, can be useful.

When a carded or combed pad or web of fibers is used, embossing elements should have at least some fairly closely disposed blades or other elements which act transversely of the general direction of the fibers to insure that they are fixed permanently to the binding as discussed.

EXAMPLE I

A carpet was prepared according to the method described in connection with FIG. 1. The carpet had a vertical cross section as shown in FIG. 2. The carpet was made from Loktuft®, a non-woven polypropylene fabric heat sealed only on one side.

The dimensions of the fabric upon heat sealing were: the heat sealed portion, approximately 1 mm. or somewhat less; the remaining fibers, non-heat sealed portion, about 2 mm. or somewhat less. A carded layer of face yarn of non-woven polypropylene was applied to the heat sealed surface of the fabric using an embossing roller bladed with blades approximately 3.5 mm. from front to back, spaced about 3 mm. apart. The adhesive used was a molten polyvinyl chloride.

EXAMPLE II

A carpet of Example I was further laminated together with a nonwoven, heat sealed on one side polypropylene [Loktuft®] by juxtapositioning, together with the same adhesive as used in Example I, the heat sealed surface of the to be added Loktuft® and the non-heat sealed surface of the Example I product, thus to obtain the composited laminate having a facing, as described in Example I, and a non-slip, fibrous mat bottom.

EXAMPLE III

The product of Example I was prepared with an integral layer of jute between the heat sealed surface of the Loktuft® and the facing yarn. The same adhesive was used.

The temperatures at which face yarn, the backing and/or adhesive will become tacky enough to cause a face yarn to adhere are correlated with each other to the extent that the face yarn and/or the backing shall not be unduly adversely affected, for example, when polyvinyl chloride adhesive is used, the temperature at which it is sufficiently tacky or fused to receive and upon cooling to retain the face yarn and the amount of heat contained in it is insufficient to melt adversely the fibers of the face yarn as when it is a polyolefin, polyester, polyamide, etc., e.g., polypropylene.

Loktuft® is a non-woven fabric of polypropylene fibers and is available from Phillips Fibers Corporation, Greenville, S.C. Loktuft® is available in rolls of about 100 to 800 lineal yards and up to about 30 inches in width. Loktuft® has a weight of about three or four to six ounces per square yard, a tensile strength in the "warp" direction of about 80–90 pounds and a tensile strength in the fill or woof direction of about 90–100 pounds [1]. Loktuft®, we have found, will hold up to about four times as much asphalt material as will burlap mats, cotton fibers, woven cloth, etc.

One skilled in the art having studied this disclosure will recognize that no face yarn is buried in a backing as in the making of a conventional or other type carpeting. Thus, utilization is at an optimum for covering, resiliency and durability.

By "heat sealable" it is intended to include those materials which when heated will fuse together as at their point of contact, e.g., when a mass of thermoplastic fibers is heated and at least at their point of contact the fibers become joined by fusion.

---

[1] Tests made on a sample 4 x 6 in. on a Scott Tester.

One skilled to the art, having studied this disclosure will understand that the disposition of the elements shown in the drawing can be other than are there illustrated. For example, as when an adhesive is being applied it can be applied in a downwardly direction, as shown, or it can be applied in an upwardly direction by means known in the art, such as spraying, extrusion or dipping. Even when a liquid or fluid is used, it can be applied by method and means here stated or included by reference.

The carpet which is all-synthetic has a face fiber attached to a backing pad by mechanical pressure, heat, and/or a bonding agent depending on the fiber composition of the face and pad. This kind of structure is quite simple and, as noted, quite inexpensive to produce, yet as above noted possesses optimum cover, resiliency and durability.

Reasonable variation and modification are possible within the scope of the foregoing disclosure, drawings, and the appended claims to the invention the essence of which is that a non-woven fibrous fabric is made of a plastic such as a polyolefin, polyamide, polyester, etc., is heat sealed on at least one surface thereof, and there is applied to said heat sealed surface a face yarn as by heat sealing or as with an adhesive; in one embodiment with the use of an adhesive to produce a structure or laminate having some rigidity, good pliability and good dimensional stability and in another embodiment the laminate being further laminated together with a further layer, say, of non-woven fabric being applied as by heat sealing or as with an adhesive to the other side of said non-woven fibrous fabric, and that a method for preparing such structures has been set forth.

I claim:

1. A method for producing a carpet-like structure which comprises emplacing upon a heat sealed surface of a heat sealable, non-woven thermoplastic fabric a facing yarn and passing the thus juxtapositioned materials under adhesion producing conditions through an embossing zone and therein embossing said facing yarn onto said surface.

2. A method according to claim 1 wherein there is placed upon the heat sealed surface an adhesive.

3. A method according to claim 1 wherein the embossing zone is heated and the embossing heats at least one of the facing yarn and fabric to cause said adhesion.

References Cited

UNITED STATES PATENTS

| | | | |
|---|---|---|---|
| 3,533,871 | 10/1970 | Zentmyer | 161—67 |
| 3,575,778 | 4/1971 | Wilcox | 161—67 |

FOREIGN PATENTS

| | | | |
|---|---|---|---|
| 1,801,266 | 8/1969 | Germany | 156—72 |

WILLIAM J. VAN BALEN, Primary Examiner

U.S. Cl. X.R.

156—205, 210, 324; 161—66, 67